(12) United States Patent
Liu et al.

(10) Patent No.: US 11,526,781 B2
(45) Date of Patent: Dec. 13, 2022

(54) AUTOMATIC SENTENCE INFERENCING NETWORK

(71) Applicant: International Business Machines Corporation, Armonk, NY (US)

(72) Inventors: Su Liu, Austin, TX (US); Jinho Lee, Austin, TX (US); Inseok Hwang, Austin, TX (US); Matthew Harrison Tong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 16/665,073

(22) Filed: Oct. 28, 2019

(65) Prior Publication Data

US 2021/0125085 A1 Apr. 29, 2021

(51) Int. Cl.
*G06F 17/00* (2019.01)
*G06N 5/04* (2006.01)
*G06F 3/04812* (2022.01)
*G06N 3/08* (2006.01)
*G06F 40/10* (2020.01)

(52) U.S. Cl.
CPC .......... *G06N 5/04* (2013.01); *G06F 3/04812* (2013.01); *G06F 40/10* (2020.01); *G06N 3/08* (2013.01); *G06N 5/046* (2013.01); *G06N 5/048* (2013.01)

(58) Field of Classification Search
CPC .......... G06N 5/04; G06N 5/046; G06N 5/048; G06N 3/08; G06F 3/04812; G06F 40/10
USPC .......................................................... 704/9
See application file for complete search history.

(56) References Cited

U.S. PATENT DOCUMENTS

| | | | |
|---|---|---|---|
| 9,235,654 B1 | 1/2016 | Gupta et al. | |
| 9,996,523 B1* | 6/2018 | Su | G06F 40/274 |
| 10,872,203 B2* | 12/2020 | Orr | G06F 40/232 |
| 11,216,510 B2* | 1/2022 | Jiang | G06N 3/0454 |
| 2010/0280821 A1* | 11/2010 | Tiitola | G06F 40/274 |
| | | | 704/200 |
| 2013/0275164 A1* | 10/2013 | Gruber | G10L 17/22 |
| | | | 705/5 |
| 2014/0012568 A1 | 1/2014 | Caskey et al. | |
| 2015/0012867 A1* | 1/2015 | Yoon | G06F 3/04886 |
| | | | 715/773 |
| 2017/0004831 A1* | 1/2017 | White | G10L 15/26 |
| 2018/0341675 A1 | 11/2018 | Zhu et al. | |
| 2019/0122766 A1* | 4/2019 | Strader | G06F 16/3344 |

(Continued)

OTHER PUBLICATIONS

Chen: Efficient Automatic OCR Word Validation Using Word Partial Format Derivation and Language Model (Year: 2010).*

(Continued)

*Primary Examiner* — Paul C McCord
(74) *Attorney, Agent, or Firm* — Scully, Scott, Murphy & Presser, P.C.; Brian Welle

(57) ABSTRACT

A set of partial words is received. At least one partial word in the set of partial words is completed. The set of partial words with the at least one completed partial word is run through a trained deep neural network, the trained deep neural network inferring a word embedding associated with an unfinished word in the set of partial words. An inferred word is determined based on the inferred word embedding associated with the unfinished word. A sentence may be output, which includes at least the completed partial word and the inferred word.

14 Claims, 17 Drawing Sheets

(56) References Cited

U.S. PATENT DOCUMENTS

2019/0370393 A1* 12/2019 Finch ............... G06F 16/3338
2020/0097809 A1* 3/2020 Velasco ............. G06F 16/3347

OTHER PUBLICATIONS

Li: A neural network based solution for automatic typing errors correction (Year: 2011).*
Ghosh: Neural Networks for Text Correction and Completion in Keyboard Decoding (Year: 2017).*
Basu, S., "How to Auto-Complete Sentences, Text in Windows With PhraseExpress", https://www.guidingtech.com/8124/auto-complete-text-sentences-windows-phraseexpress/, Sep. 23, 2011, Accessed on Oct. 25, 2019, 6 pages.
Staff Writer, "Google launches auto-complete sentences in Gmail", https://mybroadband.co.za/news/software/259315-google-launches-auto-complete-sentences-in-gmail.html, May 8, 2018, Accessed on Oct. 25, 2019, 3 pages.
Kim, Y., "Convolutional Neural Networks for Sentence Classification", New York University, http://www.people.fas.harvard.edu/~yoonkim/data/sent-cnn-slides.pdf, Accessed on Oct. 25, 2019, 34 pages.

* cited by examiner

|         | 902       |     |     |     |
|---------|-----|-----|-----|-----|
| The ->  | 0.3 | 0.1 | 1.5 | 0.7 | 904
| screen -> | 4.2 | 1.3 | 4.2 | 0.1 | 906
| is ->   | 2.5 | 3.1 | 0.2 | 1.7 | 908
| too ->  | 0.1 | 0.1 | 7.1 | 2.5 | 910
| bright -> | 3.1 | 2.7 | 5.1 | 1.1 | 912

FIG. 9

AUTOMATIC SENTENCE INFERENCING NETWORK

BACKGROUND

The present application relates generally to computers and computer applications, and more particularly to user interface screen technology, machine learning techniques and automatic sentence inference.

Some search engines suggest search queries, for example, based on terms entered successively as search input. Other computer applications may provide a sentence completion capability. Existing sentence completion techniques, however, work on words that are already written or complete. Results of sentence completion or suggestions provided based on a small number of already completed words can likely be incorrect as there may only be a limited number of possible sentences that can be inferred from a small number of complete words. On the other hand, automatic sentence completion may not be much of a benefit, if a user has to provide a large number of complete words that make up the sentence.

In another aspect, a small number of words may not provide enough contexts for completing a sentence. Consider an example intended sentence, "The screen is really bright". Consider that a user enters the term, "the" followed by "screen", the input words being, "the screen". While an existing tool may provide alternative words such as "that" and "then" for the term "the" and alternative words such as "scratch" and "scrub" for the term "screen", for example, making up possible phrases, "that scratch" and "then scrub", as possible suggestions for the entered words "the screen", those phrases do not provide meaningful context for predicting a full sentence. Rather, a user is left to enter or pick every word.

As another example, consider that the user continues with entering more words. For example, the user enters another term "is" following the entered terms "the" and "screen", the words entered so far being "the screen is". Even with the additional word, an existing technique may not be able to predict the intended sentence accurately as the possibilities of additional words that can follow that phrase may be infinite. For example, any number of words or phrases can follow "the screen is", such as "the screen is wide", "the screen is pretty", and "the screen is broken."

BRIEF SUMMARY

A computer-implemented method and system can be provided, which automatically infer a sentence (e.g., a complete sentence) given a set of partial words. The method, in one aspect, can include receiving a set of partial words. The method can also include completing at least one partial word in the set of partial words. The method can further include running the set of partial words with the at least one completed partial word through a trained deep neural network, the trained deep neural network inferring a word embedding associated with an unfinished word in the set of partial words. The method can also include determining an inferred word based on the inferred word embedding associated with the unfinished word. The method can further include outputting a sentence including at least the completed partial word and the inferred word.

In another aspect, a computer-implemented method can include receiving a set of partial words. The method can also include completing at least one partial word in the set of partial words. The method can further include running the set of partial words with the at least one completed partial word through a trained deep neural network, the trained deep neural network inferring a word embedding associated with an unfinished word in the set of partial words. The method can also include determining an inferred word based on the inferred word embedding associated with the unfinished word. The method can further include outputting a sentence including at least the completed partial word and the inferred word. The trained deep neural network can infer word embeddings associated all of unfinished words in the set of partial words concurrently.

In yet another aspect, a computer-implemented method can include receiving a set of partial words. The method can also include completing at least one partial word in the set of partial words. The method can further include running the set of partial words with the at least one completed partial word through a trained deep neural network, the trained deep neural network inferring a word embedding associated with an unfinished word in the set of partial words. The method can also include determining an inferred word based on the inferred word embedding associated with the unfinished word. The method can further include outputting a sentence including at least the completed partial word and the inferred word. At least one partial word can be selected randomly for the completing step.

In another aspect, a computer-implemented method can include receiving a set of partial words. The method can also include completing at least one partial word in the set of partial words. The method can further include running the set of partial words with the at least one completed partial word through a trained deep neural network, the trained deep neural network inferring a word embedding associated with an unfinished word in the set of partial words. The method can also include determining an inferred word based on the inferred word embedding associated with the unfinished word. The method can further include outputting a sentence including at least the completed partial word and the inferred word. Determining of the inferred word based on the inferred word embedding associated with the unfinished word can include generating a plurality of finished words based on the unfinished word, representing each of the plurality of finished words with a word embedding, and choosing a finished word from the plurality of finished words having a closest word embedding to the inferred word embedding.

In a further aspect, a computer-implemented method can include receiving a set of partial words. The method can also include completing at least one partial word in the set of partial words. The method can further include running the set of partial words with the at least one completed partial word through a trained deep neural network, the trained deep neural network inferring a word embedding associated with an unfinished word in the set of partial words. The method can also include determining an inferred word based on the inferred word embedding associated with the unfinished word. The method can further include outputting a sentence including at least the completed partial word and the inferred word. The method can further including constructing an input data including an array of word embeddings, the array including the word embedding associated with the completed partial word and no word embedding associated with the unfinished word, wherein the running of the set of partial words with the at least one completed partial word through a trained deep neural network includes running the input data through the trained deep neural network.

In yet another aspect, a computer-implemented method can include receiving a set of partial words. The method can also include completing at least one partial word in the set of partial words. The method can further include running the set of partial words with the at least one completed partial word through a trained deep neural network, the trained deep neural network inferring a word embedding associated with an unfinished word in the set of partial words. The method can also include determining an inferred word based on the inferred word embedding associated with the unfinished word. The method can further include outputting a sentence including at least the completed partial word and the inferred word. The method can further include repeating the completing, running, determining and outputting, with a different at least one partial word selected randomly for the completing.

In a further aspect, a computer-implemented method can include receiving a set of partial words. The method can also include completing at least one partial word in the set of partial words. The method can further include running the set of partial words with the at least one completed partial word through a trained deep neural network, the trained deep neural network inferring a word embedding associated with an unfinished word in the set of partial words. The method can also include determining an inferred word based on the inferred word embedding associated with the unfinished word. The method can further include outputting a sentence including at least the completed partial word and the inferred word. The method can also include causing a cursor positioning function key to be provided for modifying the set of partial words entered via a user interface, wherein the cursor positioning function key functions to move a cursor appearing on an input field from an entered input word to another entered input word.

A system, in one aspect, can include a hardware processor. A memory device can be communicatively coupled with the hardware processor. The hardware processor can be configured to receive a set of partial words. The hardware processor can also be configured to complete at least one partial word in the set of partial words. The hardware processor can also be configured to run the set of partial words with the at least one completed partial word through a trained deep neural network, the trained deep neural network inferring a word embedding associated with an unfinished word in the set of partial words. The hardware processor can also be configured to determine an inferred word based on the inferred word embedding associated with the unfinished word. The hardware processor can also be configured to output a sentence including at least the completed partial word and the inferred word.

In another aspect of the system, the trained deep neural network can infer word embeddings associated all of unfinished words in the set of partial words concurrently.

Yet in another aspect of the system, the hardware processor can be configured to select randomly the at least one partial word for completing.

Still yet in another aspect of the system, the hardware processor can be configured to generate a plurality of finished words based on the unfinished word, represent each of the plurality of finished words with a word embedding, and choose a finished word from the plurality of finished words having a closest word embedding to the inferred word embedding, to determine the inferred word based on the inferred word embedding associated with the unfinished word includes.

In a further aspect of the system, the hardware processor can be configured to construct an input data including an array of word embeddings, the array including the word embedding associated with the completed partial word and no word embedding associated with the unfinished word. The hardware processor can be configured to run of the set of partial words with the at least one completed partial word through a trained deep neural network by running the input data through the trained deep neural network.

In another aspect of the system, the hardware processor can be further configured to repeat completing, running, determining and outputting, with a different at least one partial word selected randomly for the completing.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 9 shows an example word2vec vector for words in a sentence in one embodiment.

DETAILED DESCRIPTION

In embodiments, systems, methods and techniques can be provided which facilitate user interface input mechanism and word and/or sentence completion based on partial words and/or sentences. A system can be a computer system, and a method and/or technique can include a computer-implemented method and/or technique, which for example, can be executed on at least one hardware processor or circuitry such as an integrated circuit. In embodiments, the systems, methods and techniques can automatically complete a sentence (e.g., generate a full sentence) from an input including at least a word that is partially complete. In embodiments, word and/or sentence completion can occur by implementing a machine learning algorithm such as an artificial neural network, and more particularly a word convolutional deep learning neural network, but not limited to such techniques. Other techniques can be used, including other machine learning algorithms.

In embodiments, an input mechanism such as a key can facilitate or simplify cursor movements of a device (e.g., a display device), for example, allow a cursor on an input device to move between words efficiently. Various embodiments may be combined, and similarly, one or more components of various embodiments may be combined. A cursor refers to a movable indicator on a display screen (e.g., computer screen, mobile device screen) identifying the point that can be affected by input, for example showing where typed text or input data can be inserted.

Computer applications such as search engines, messaging applications, word processing applications, and other application may use automatic completion techniques, which may automatically complete input data such as text to perform word completion and sentence completion based on partial forms of words. Providing an automatic input (such as text) completion technique can improve such computer applications, for example, automating a machine to be able to predict sentences based on entered input, and can also reduce the number of characters or elements, which need to be typed or entered into an input field area. In some user devices, input field area may have limited size. Hence, reducing the number of characters or symbols that are entered can be beneficial. An embodiment of a system described herein can suggest a whole sentence with incomplete words as input, for instance, requiring less user input.

Figure 1:
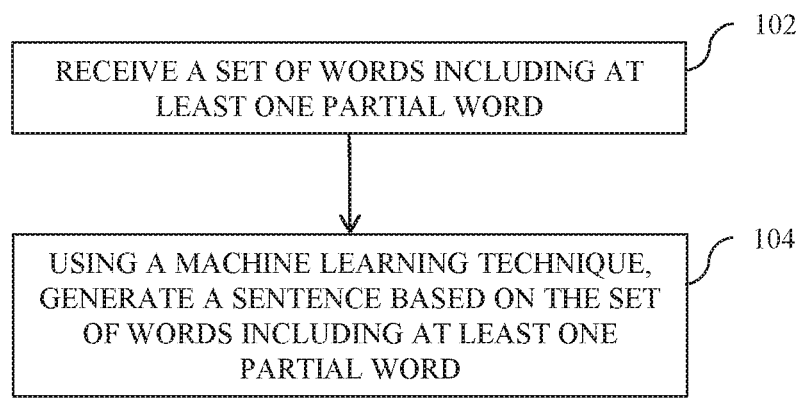
FIG. 1 is a diagram illustrating a method of suggesting a sentence in an embodiment.

FIG. 1 is a diagram illustrating a method in one embodiment. The method can be executed on a computer processor, for example, a hardware processor. Such a computer processor may include components such as programmable logic devices, microcontrollers, memory devices, and/or other hardware components, which may be configured to perform various steps of the method. In an embodiment, the method converts a set of partials words to a sentence. Such a conversion can generate and/or output multiple sentences as candidates.

Referring to FIG. 1, at 102, the method can include receiving a set of words, the set of words including at least one partial word. For example, the method can include receiving a set of partial words. By way of example, each word in the set can be a partial word. As another example, some of the words in the set of words can be partial words. A word or a partial word can be separated by a separation character such as a space character, comma, semicolon, and/or another character. In an embodiment, one or more separation characters can be predefined such that the method can detect separated words or partial words from one another.

At 104, the method can include, using a machine learning technique, generating a sentence based on the set of words including at least one partial word. For example, the method may include forming or identifying complete words from the partial words. For instance, the method may infer a complete word, which can be formed from a partial word in the set. The method may generate or suggest a sentence that is made up of the inferred complete words. In an embodiment, a deep learning neural network (also referred to as a DNN) can be implemented, which can include word convolutions, for example a convolutional neural network (CNN). Word convolutions employ convolutional layers, which compute over 1-dimensional (1D) word embedding values. For instance, the convolution can be performed on the input data with the use of a filter or kernel, which produces a feature map. A DNN can be trained and iteratively run to generate sentence suggestions or candidates from the set of partial words. For example, the method may include applying a deep neural network including word convolutions iteratively to generate suggested sentence recommendations from the set of partial words.

In an example implementation, a word convolution DNN (a deep neural network that can include a convolutional neural network) can complete a randomly chosen word and infer other unfinished words in the set of partial words, for example, based on inferring word embeddings associated with the other unfinished words. A sentence suggestion technique, for example, using word convolution may start from randomly completed words to infer the other unfinished words' embeddings. Such a sentence suggestion technique gathers or identifies suggestions for each partial word and one with the closest word embedding can be used. Multiple iterations can be implemented, randomly erasing one or more words.

Figure 2:
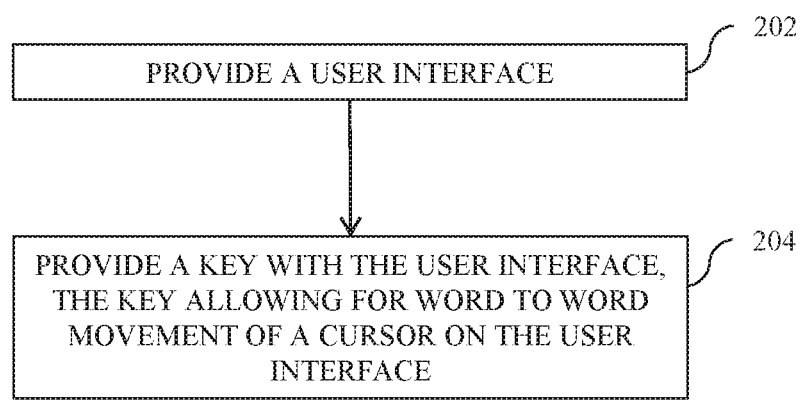
FIG. 2 is a diagram illustrating method of providing a user interface key in an embodiment.

FIG. 2 is a diagram illustrating a method in an embodiment. The method allows for entry of words or partial words and to modify the entered partial words. At 202, the method may include providing a user interface, which allows a user to input a set of partial words, based on which a sentence can be generated.

At 204, the method may include providing a key with the user interface, for instance, responsive to the user utilizing the user interface. The key allows the user to navigate the partial words, for example, the key can allow a word-to-word movement of a cursor on the user interface. For example, the key can follow the movement of a cursor associated with input data, for instance, on a word-by-word basis. As another example, the key can be placed or located adjacent to or in the vicinity of an input entry area. In yet another example, an existing key of a keyboard can be configured or programmed to function to jump or move the cursor to another word or partial word entered in the input entry area. Responsive to the key being pressed or selected, the cursor can be caused to move to a configured direction. The configured direction can be a forward direction. For example, clicking or pressing on the key (selecting the key) moves the cursor to the next word (partial word). As another example, the configured direction can be a reverse direction. For example, pressing on the key (selecting the key) moves the cursor to the previous word (or partial word). The configured direction can be predefined and/or programmable. In an embodiment, the cursor moves to the end of the next word (or partial word) or to the end of the previous word (or partial word), e.g., depending on the configured direction. In the forward direction configuration, if the cursor is at the last word (or partial word) in the set of partial words, selecting the key wraps around the cursor to the first word (or partial word) in the set of partial words (e.g., clockwise wrap). In the reverse direction configuration, if the cursor is at the first word in the set of partial words, selecting the key wraps the cursor around to the last word in the set of words (e.g., counterclockwise wrap).

For instance, the method may include causing an activation of an input key, for example, on a keyboard. The keyboard can be a physical keyboard or a virtual keyboard (e.g., on-screen or a touchscreen display presented on a smartphone, tablet, or another device). In an embodiment, the key can remain active (e.g., ready to be selected) at anytime during which an input is allowed to be entered, for example, on a device's input area. Selecting the key (e.g., clicking or pressing on the key) moves a cursor in the input area to jump or to move to another word or partial word (e.g., next or previous word or partial word) entered on the device.

Providing such a key or such a function can allow for fast and efficient movement of a cursor from a word to another word in a set of partial words entered in the input field or area of a device. For instance, subsequent to entering a set of partial words sequentially from beginning to end, clicking on the key can cause the cursor to jump or go back to the beginning of the sentence (set of partial words), for instance, to be able to enter more hints or even manually finish the sentence.

Figure 3:
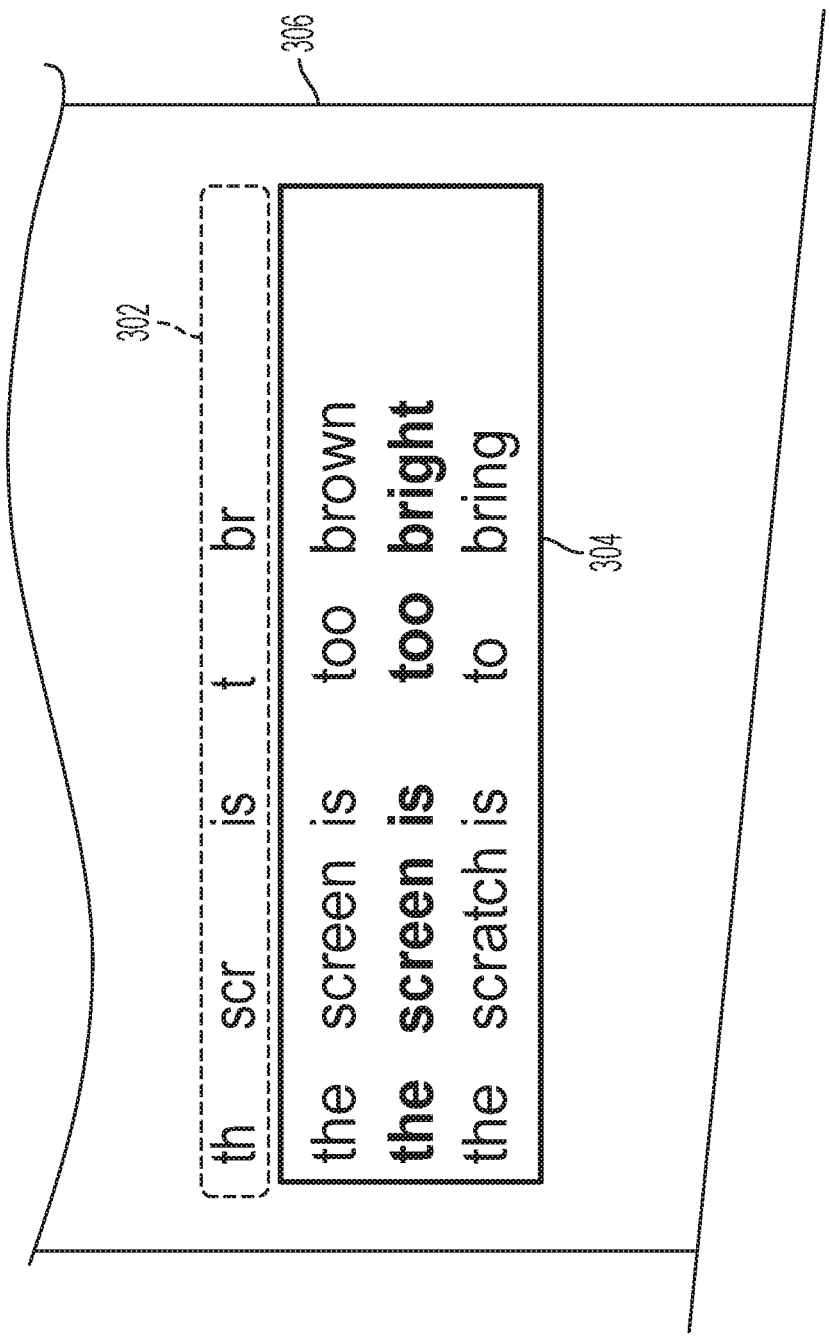
FIG. 3 shows an example input entry field of a user device and candidate sentence suggestions produced using a method described, for instance, with reference to FIG. 1, in an embodiment.

FIG. 3 shows an example input entry field of a user device and candidate sentence suggestions produced using a method described, for instance, with reference to FIG. 1, in an embodiment. Consider that the example sentence to be predicted is "The screen is too bright." A user may input a set of partial words 302 or a set of words including at least one partial word into an input field, for example, on a display device 306. A sentence completion technique in an embodiment generates candidate sentences 304, for example, based on completing the input partial words 302, for example, each of the partial words. In this way, the amount of input or the number of characters that need to be typed can be reduced and yet a system can provide more accurate sentence suggestions.

Figure 4:
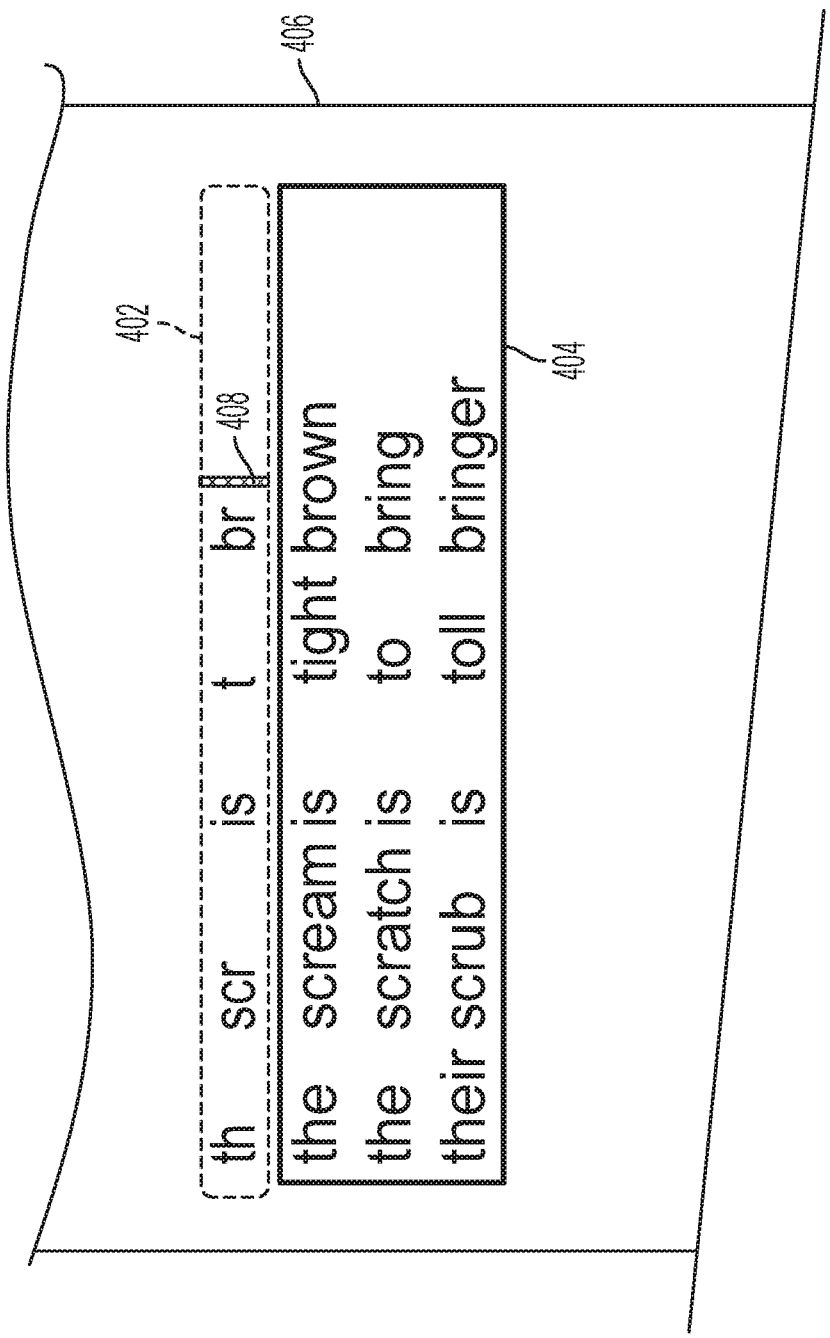
FIG. 4 shows another example input entry field of a user device and candidate sentence suggestions produced in an embodiment.

FIG. 4 shows another example input entry field of a user device and candidate sentence suggestions produced using a method in one embodiment. Consider again that the example sentence to be predicted is "The screen is too bright." A user may input a set of partial words 402 or a set of words including at least one partial word into an input field, for example, on a display device 406. In this example, however, the sentence completion technique does not, at least initially, suggest candidate sentences that match the target sentence to be predicted (e.g., "The screen is too bright"). The reason can be that not enough hints have been provided to a sentence completion or prediction system, the sentence completion or prediction system has not been trained with enough data or learned enough, and/or another reason. In the example, the cursor 408 is positioned at the end of the entered partial words, for instance, since a cursor moves with the most recent input data and remains at that position until it is moved, for example, by typing another character or clicking a cursor movement key such as an arrow key. In some instances, trying to modify already input partial words at different positions in the input field can become cumbersome as there may not be a simple mechanism to position the cursor at the word or partial word, which is desired to be modified.

In an embodiment, a cursor positioning function (also referred to as a "jump" function) can be provided. For instance, a user interface key (also referred to as "jump" key) may be provided. Such as user interface key be located or displayed with an input field on a display screen or device, for instance, in the vicinity of the input field. In another embodiment, an existing key can be programmed or configured to act as a cursor positioning function key. Selecting or pressing on the key moves the cursor to another word or partial word entered in the input field.

Figure 5:
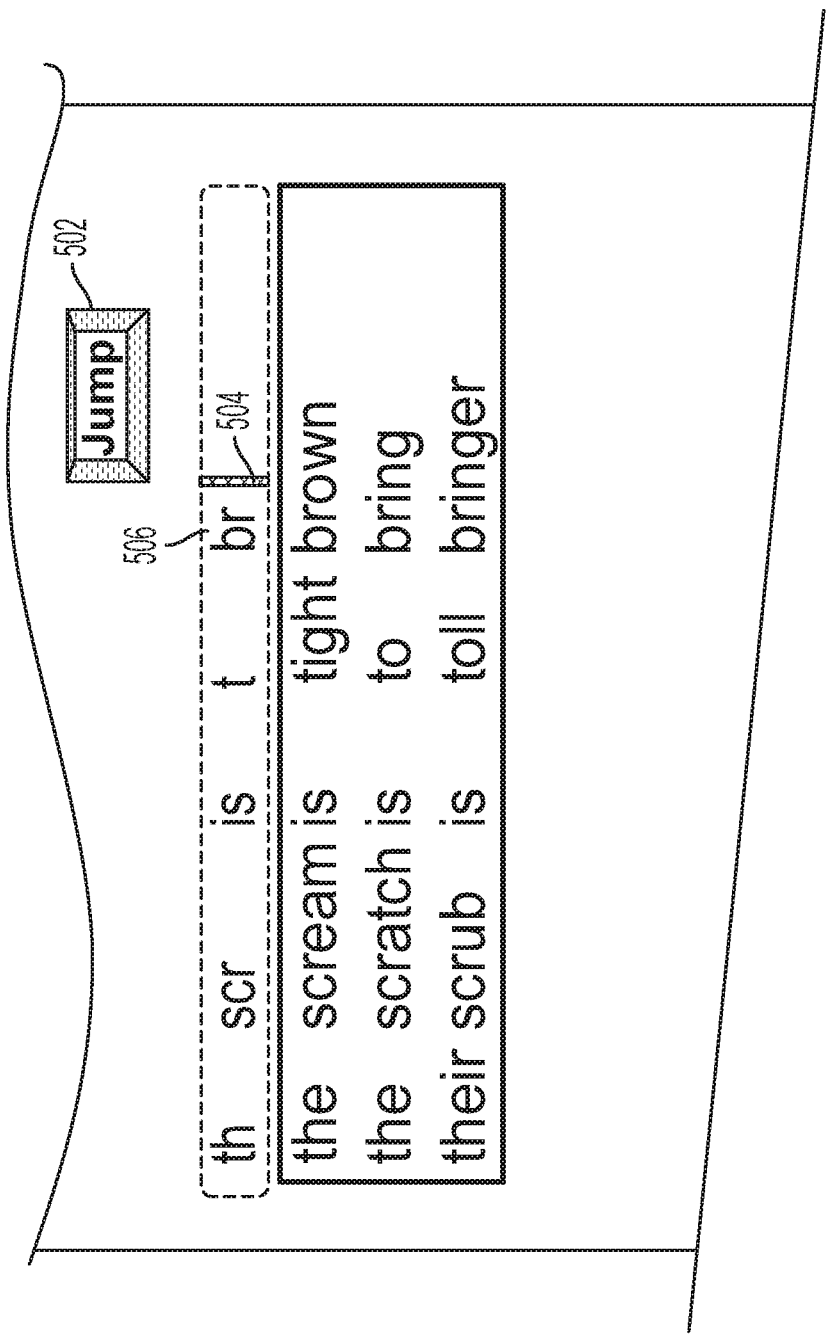
FIG. 5 shows an example input entry field of a user device with a cursor positioning function key in an embodiment.

FIG. 5 shows an example input entry field of a user device with a cursor positioning function key in an embodiment. While the figure shows the cursor positioning function key 502 with a label "jump", it is contemplated that such a key need not be labeled, or can have any other labels. Such a cursor positioning function key 502 can be positioned with the position of the cursor 504. For instance, considering that the last entered partial word is "br" 506 in this example, the cursor 504 is positioned at the end of that term 506. In an embodiment, selecting the cursor positioning function key 502 (for example, clicking once on the key) can move the cursor 504 to another word, for example, an adjacent word. An adjacent word can be the next word or the previous word. The direction of the key movement can be configured, for example, with the forward direction being a default direction. The cursor can be placed at the end of that adjacent word. In another embodiment, the cursor can be positioned at another place within that adjacent word. Such positioning of the cursor within a word or partial word can also be configured. Providing a cursor positioning function key 502 can improve a user interface, to be able to facilitate movements of a cursor. A user may use the cursor positioning function key 502 to provide more hints on any one of the entered partial words (e.g., by adding more characters to the partial word or completing the partial word) or completing the full sentence.

In the example shown in FIG. 5, selecting the cursor positioning function key 502 can move the cursor positioned at the end of "br" 506 to wrap around to the first entered partial word, "th" 508 (e.g., beginning of the current sentence). For instance, the wrap around can occur from the end of the current sentence to the beginning of the current sentence. A sentence, for example, can be detected based on containing a term preceding a character such as a period, semicolon, or another character which can signal an end of a sentence. As another example, wrap around can occur from the end of the last entry to the beginning of the entry.

In a case where there are multiple sentences, whether to wrap around at the end of one sentence or at the end of the last entry can be configured, for example, with a default being set to wrap around at the end of the last entry. In an embodiment, the location of the cursor positioning function key can also move along with the cursor movement.

Figure 6:
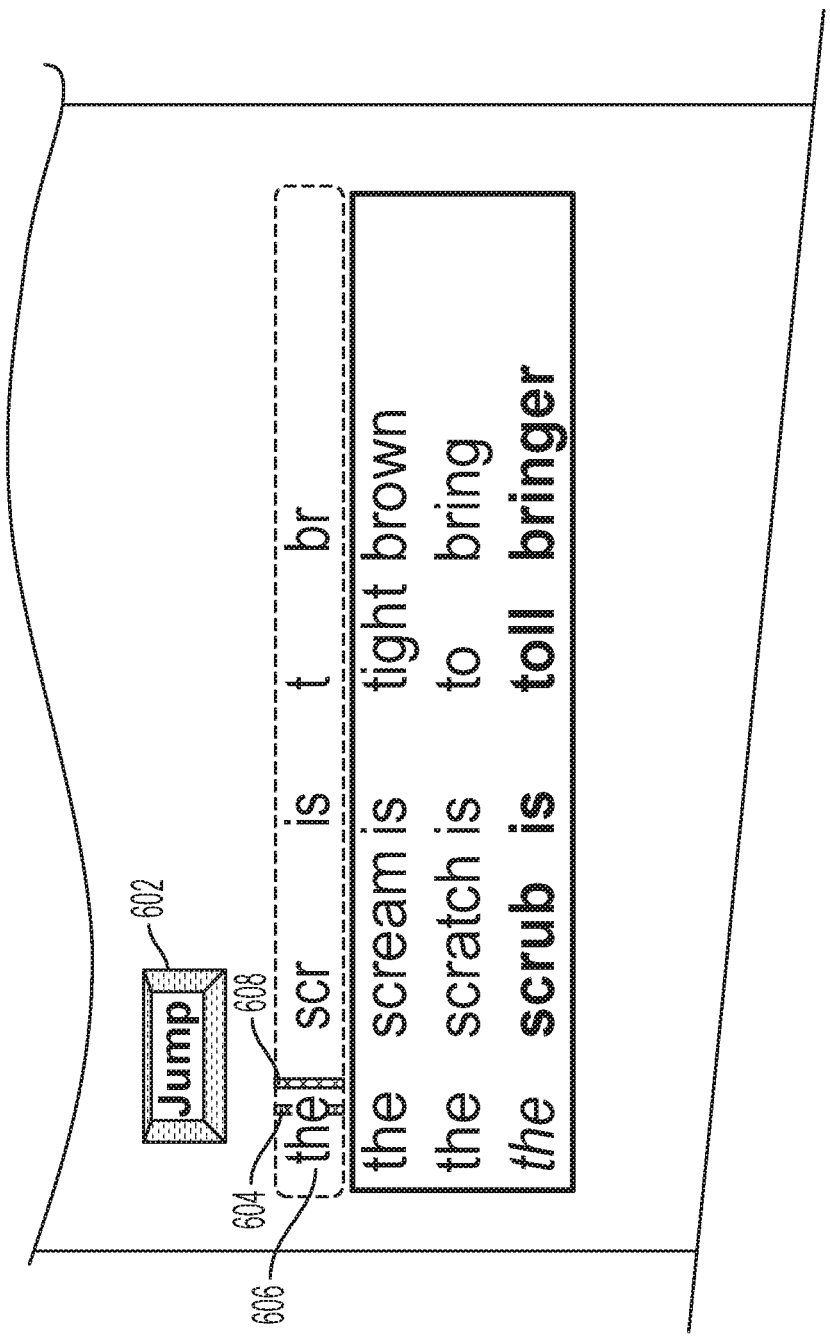
FIG. 6 shows an example input entry field of a user device illustrating functioning of a cursor positioning function key in an embodiment.

FIG. 6 shows an example input entry field of a user device illustrating functioning of a cursor positioning function key in an embodiment. The position of the cursor 604 is wrapped around from the last entry "br" (e.g., shown in FIG. 5) to the first entry "th" 606 shown in FIG. 6. The cursor positioning function key 602 has moved or wrapped around along with the cursor position 604. By way of example, the user can input additional data, in this example, "e" to provide more hints. Responsive to the user entering "e" character, the cursor 604 moves to the end of the word, "the" as shown at 608. Responsive to the cursor positioning function key being selected, the cursor moves to the end of the next word, in this example "scr".

Figure 7:
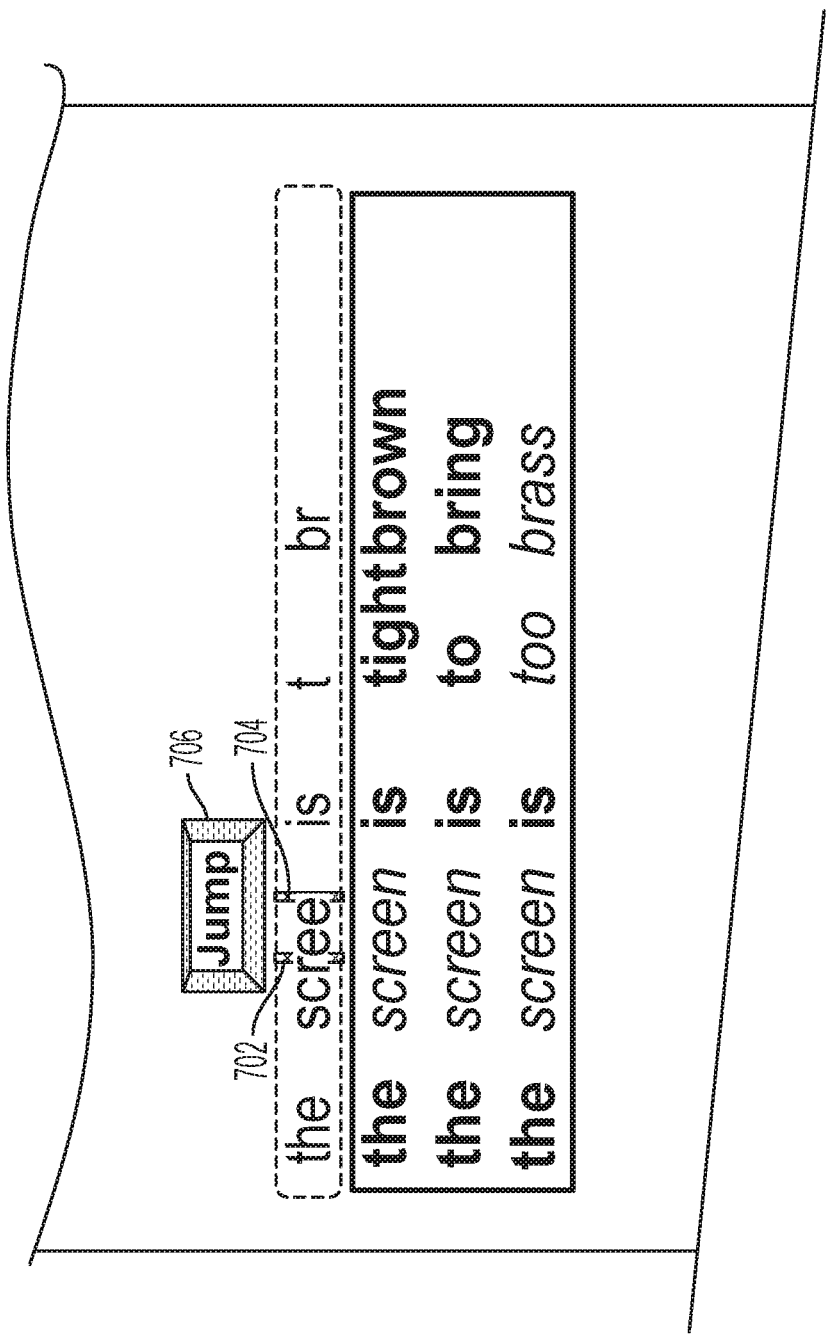
FIG. 7 shows another example input entry field of a user device illustrating functioning of a cursor positioning function key in an embodiment.

FIG. 7 shows another example input entry field of a user device illustrating functioning of a cursor positioning function key in an embodiment. In this example, the cursor 702 is positioned at the end of "scr". Subsequently, a user may enter additional characters "ee." Entry of additional characters changes the position of the cursor 704 to the end of that word entry, "scree". In this example also, the cursor positioning function key 706 also moves along with the cursor position (e.g., from the position shown in FIG. 6 to the position shown in FIG. 7).

Figure 8:
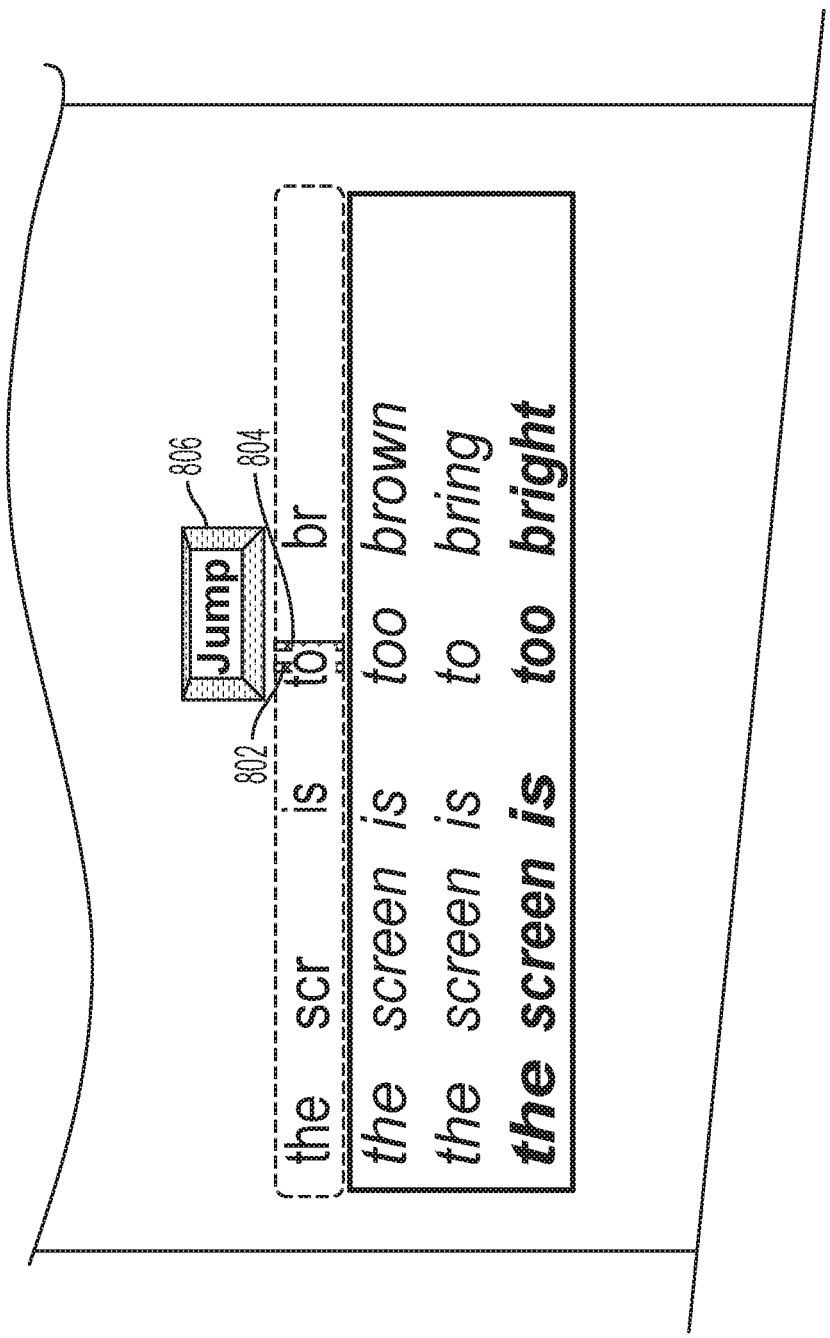
FIG. 8 shows another example input entry field of a user device illustrating functioning of a cursor positioning function key in an embodiment.

FIG. 8 shows another example input entry field of a user device illustrating functioning of a cursor positioning function key in an embodiment. Consider by way of example, that the cursor positioning function key 706 shown in FIG. 7 is selected again (e.g., clicked or pressed or otherwise actuated). The selection actuates the cursor to move to the next word or partial word, in this example, "is". The cursor positioning function key 706 can also move along with the cursor. Selecting the cursor positioning function key 706, which is positioned at the end of "is" moves the cursor to the next word, in this example, to the end of "t" as shown at 802 in FIG. 8. Typing an additional character "o" moves the cursor to the position shown at 804. The cursor positioning function key 806 can also move along with the cursor.

In another embodiment, a cursor positioning function key can be a fixed located key, for example, an existing key on a keyboard, configured to function or act as the cursor positioning function key. Yet in another embodiment, a cursor positioning function key can be a shortkey (e.g., a combination of keys selected together).

As discussed with reference to FIG. 1, a system, method and/or technique can generate a sentence based on a set of words including at least one partial word. An example of a set of words including at least one partial word is shown in FIG. 3 at 302. In an embodiment, a system, method and/or technique can complete a sentence or generate one or more candidate sentences from partial words by utilizing a word embedding technique such as word2vec and skipgram (but not limited to such technique) and word completion technique. In an embodiment, the system for example, can create or use word embedding of a defined length, for example, length of 4. Word embeddings refer to a word representation, which can include vectors of numerical values. Words with similar meaning may have a similar representation. Word2vec technique can be used to learn vector representations of words, also referred to as word embeddings.

FIG. 9 shows an example word2vec vector for words in a sentence, "The screen is too bright." For instance, a 2-dimensional vector 902 includes an array of vectors for the terms or words, "The" 904, "screen" 906, "is" 908", "too" 910 and "bright" 912. In an embodiment, the system may also use a word completion technique. For instance, given one or more partial words, the system completes the words. For example, given the partial word "th", the system can generate one or more complete words such "they", "the", "their", and/or another; given the partial word "be", the system can generate one or more complete words such as "be", "bee", "best", and/or another; given the partial word "sc", the system can generate one or more complete words such as "screen", "scam", and/or another; given the partial word, "br", the system can generate one or more complete words such as "brown", "bright" and/or another. Any word completion technique can be used, for example, including but not limited to table lookup or word match.

Figure 10:
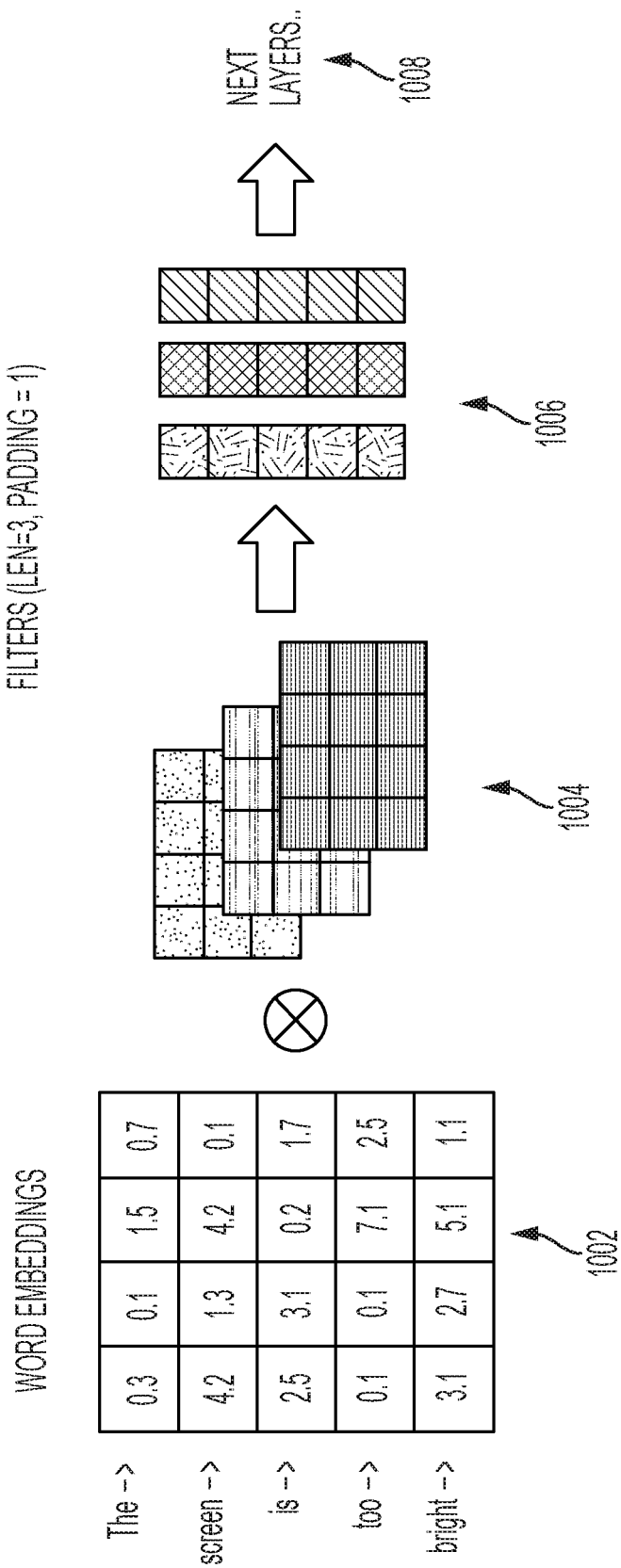
FIG. 10 illustrates an overview of a word convolutional neural network in an embodiment.

FIG. 10 illustrates an overview of a word convolutional neural network in an embodiment. The figure shows word 1-dimensional (1D) convolution in an embodiment. Word embeddings 1002 of a sentence are convolved through convolutional layers. For instance, a convolution layer may include a convolution of filter at 1004. Filter length for the filter can be preconfigured. By way of example, filter can be of length 3. A padding parameter can be set or defined, such as 1. Another convolution layer may include another filter at 1006. Convolution can include one or more additional layers 1008. Convolution layers process the input embeddings 1102 with filters (e.g., 1004), and produce a feature map (1006), which can be processed using other DNN layers. Additional CNN layers can be included (e.g., 1008). In an embodiment, no pooling is performed to keep the length of the sentence. A padding parameter can be selected that preserves the length of the sentence.

Figure 11:
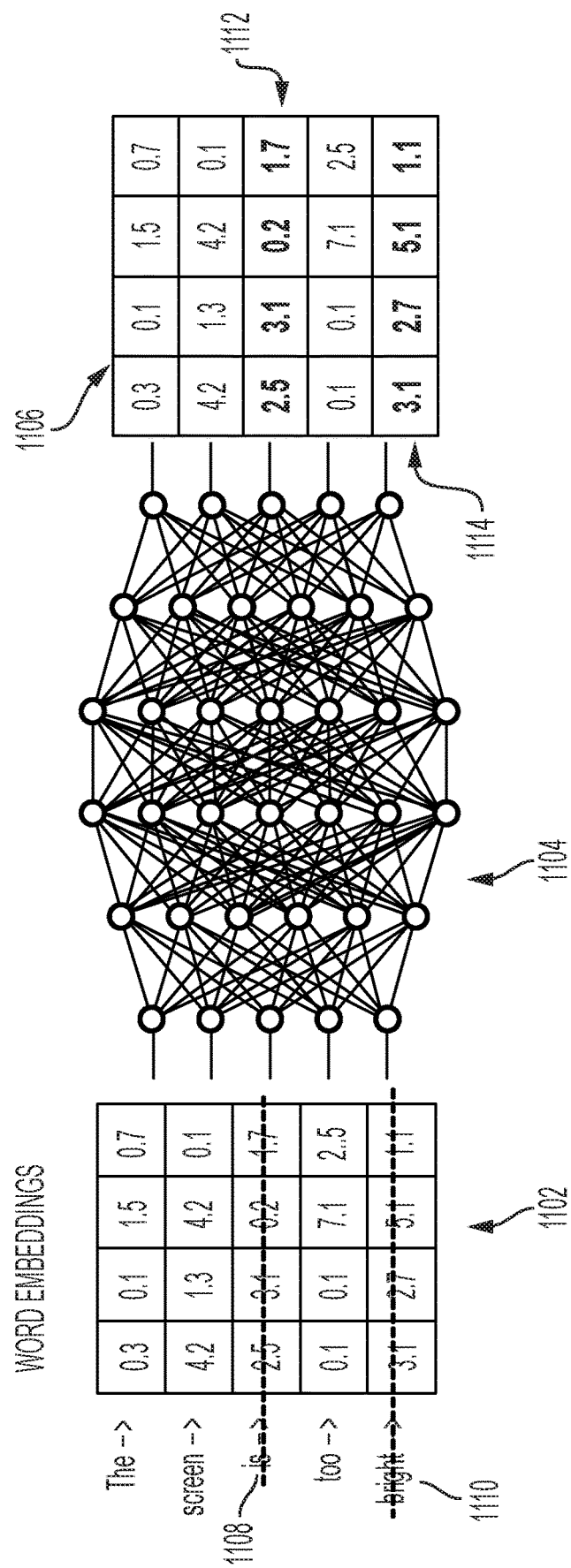
FIG. 11 illustrates a deep neural network in an embodiment that can be trained to predict word embeddings of words in a sentence.

In an embodiment, a word convolutional neural network or deep neural network can be trained to predict word embeddings of words in a sentence. FIG. 11 illustrates a deep neural network in an embodiment that can be trained to predict word embeddings of words in a sentence. A general schematic diagram of a deep learning neural network (DNN), which can include word convolution layers and fully connected layers is shown at 1104. By way of example, the word embeddings 1102 can be convolved as shown in FIG. 10 over convolutional (and possibly) layers and passed to succeeding layers. An implementation of an artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. In an embodiment, such weights can be updated using a backpropagation technique. Another technique can be used for updating weights. The resulting trained model, with weights defined via the training operation, can be applied to perform a task based on new data. An example of an artificial neural network includes a deep learning neural network with multiple layers of neurons.

Referring to FIG. 11, a corpus of sentences with their word embeddings (e.g., as shown at 1102 of a sentence), can be used as training data to train a deep neural network 1104 to be able to predict as output 1106 the word embeddings. Training in an embodiment includes erasing one or more words (their word vectors) 1108, 1110, and training the neural network 1104 to restore the word embeddings 1112, 1114. For example, training data set can be composed or constructed that includes a corpus of sentences, with some of the word in the sentences erased. Multiple iterations in training can be performed, e.g., each iteration with different set of words erased. Erasing a word may include removing the word embedding associated with that word in a sentence. For instance, word vectors 1108, 1110 can be replaced '0's or another null value representation, e.g., as place holders. The dimension of the array of word vectors and the position of the erased words are preserved, when being used as training data. The neural network can be trained with a corpus of sentences (multiple sentences) as a training set. The neural network 1104 can be a pixel convolutional neural network (pixelCNN), a generative adversarial network (GAN), and/or another type of neural network. The trained neural network can predict word embeddings of words in a sentence, given one or more complete words in the sentence. For instance, in an inference stage of the neural network, given word embeddings of some of the words in a given sentence, the trained neural network can estimate or predict word embeddings of the rest of the words in the given sentence.

Figure 12:
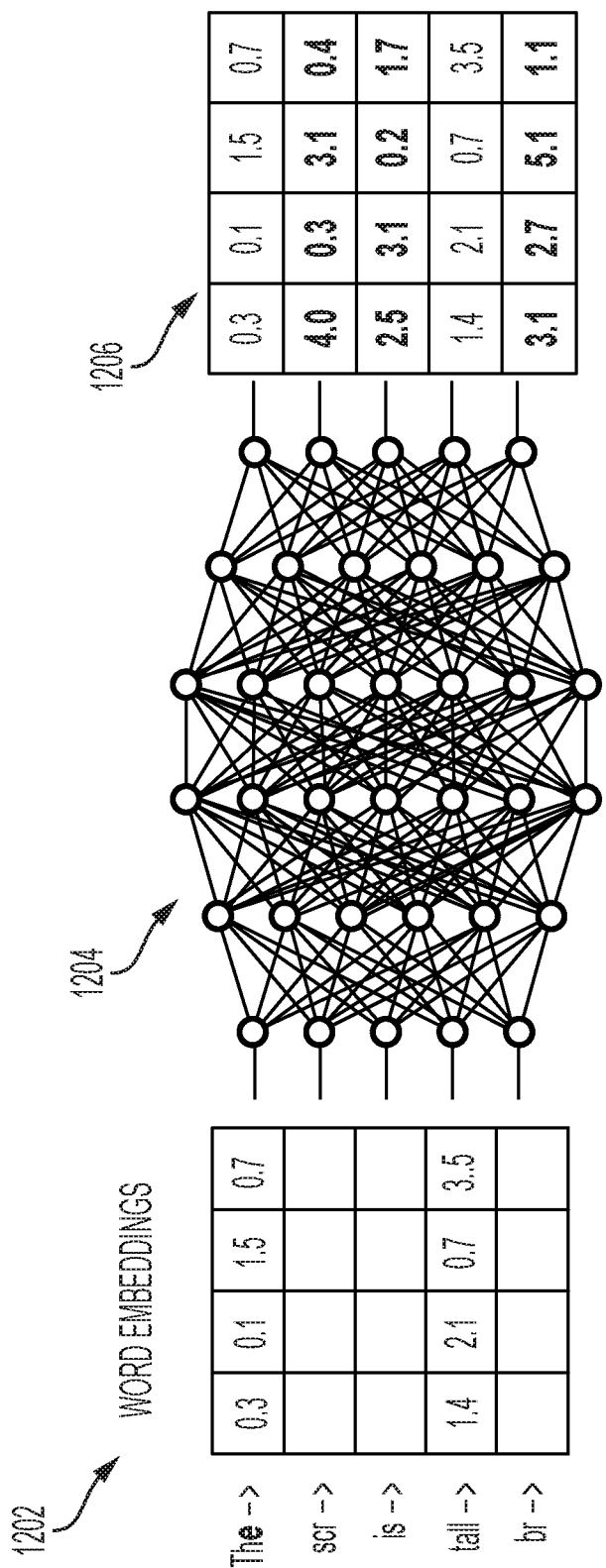
FIG. 12 illustrates example inferencing performed with a trained neural network in one embodiment.

FIG. 12 illustrates example inferencing performed with a trained neural network in one embodiment. The inferencing in an embodiment performs sentence completion given at least one complete word represented with its word vector in a sentence. A word without a word vector can be input as having null values as its word vector. For instance, words of a sentence can be represented as an array of word embeddings. Each word is represented by a word embedding of predefined length. In this example, the word embedding length is 4. Given a set of partial words, e.g., "Th scr is t br". A system in one embodiment may begin by completing a few random words, e.g., using an existing word completion technique. In the example shown in FIG. 12, the system completes the word "Th" to "The" and "t" to "tall". The word embeddings for the words "The" and "tall" are populated as input. The word embeddings for the rest of the words in the input set of partial words are left blank, e.g., null values or zeros or another value that represents blanks. The system constructs such input data, for example, a 2-dimensional vector 1202. The input array 1202 is input to the trained neural network 1204, which outputs or generates inferred embeddings 1206 for incomplete words, e.g., "scr", "is, and "br", for instance, without looking at those partial letters (that is, the input vector was constructed with blanks or place holders for those partial words).

Figure 13:
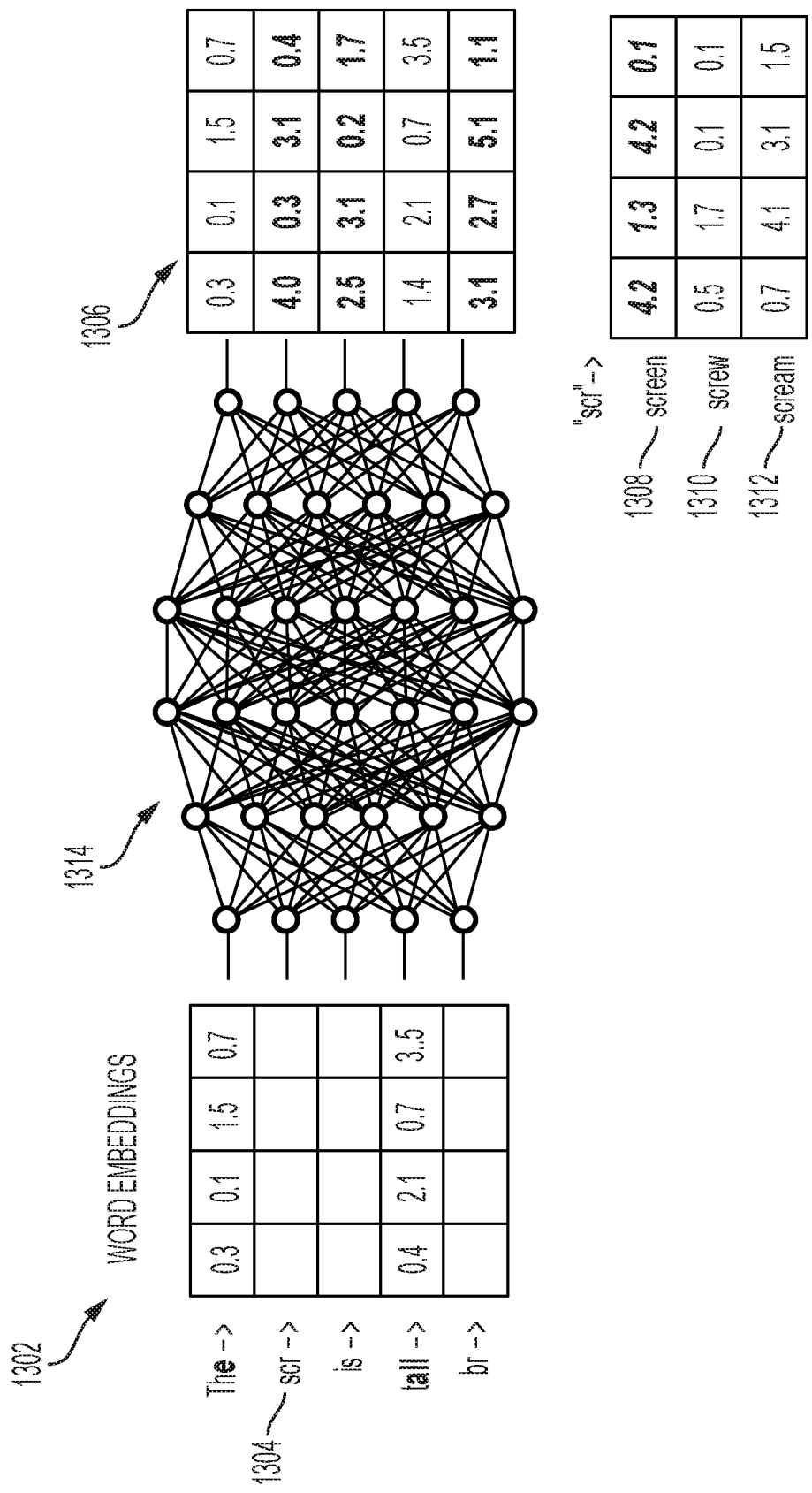
FIG. 13 shows an example of inferencing and sentence suggestion in an embodiment.

For each word, which is not complete, for example, "scr", "is" and "br", the system generates one or more complete words. The system then compares the one or more complete words with one that is inferred. The system, for example, compares the word embeddings associated with one or more complete words with the word embedding that is inferred by the neural network. By way of example, consider that for place holder position in the input array for the partial word "scr" the neural network infers a word embedding representing a word. FIG. 13 shows this example scenario. The input array 1302 with word embedding set as null for the place of "scr" 1304 in the sentence (or set of partial words), the neural network 1314 outputs or generates a word embedding ("4.0, 0.3, 3.1 and 0.4") 1306 for representing a word. The system generates one or more complete words from the letter "scr", which by way of example, can be "screen", "screw", "scream." The system compares the word embeddings of those words with the neural network generated word embedding 1306 for the "scr" in the input array. For instance, consider that the word "screen" has word embedding of "4.2, 1.3, 4.2, 0.1" 1308, the word "screw" has word embedding of "0.5, 1.7, 0.1, 0.1" 1310 and the word "scream" has word embedding of "0.7, 4.1, 3.1, 1.5" 1312. In an embodiment, the system selects or chooses the word having the word embedding that is closest to the neural network's generated word embedding. In this example, the word "screen" whose word embedding is "4.2, 1.3, 4.2, 0.1" is closest to the neural network generated word embedding, "4.0, 0.3, 3.1, 0.4" or the word embedding that best fits the neural network generated word embedding. The closeness can be measured or determined by a distance computation or another vector comparison computation, for example, a Euclidian distance computation. Another distance computation can use a "Hamming distance" technique. The system obtains a full sentence, responsive to all incomplete words being selected in the similar manner. For instance, in this example, the same process is iterated for incomplete words (partial words) "is" and "br". In an embodiment, the system may form a sentence by using a chosen word that is closest to the neural network generated word embedding. With multiple candidate words, a plurality of sentences can be provided, for example, with the sentence with the closest candidate word ranked as the highest, or in the order of closeness of the candidate words to the neural network generated word embedding.

Figure 14:
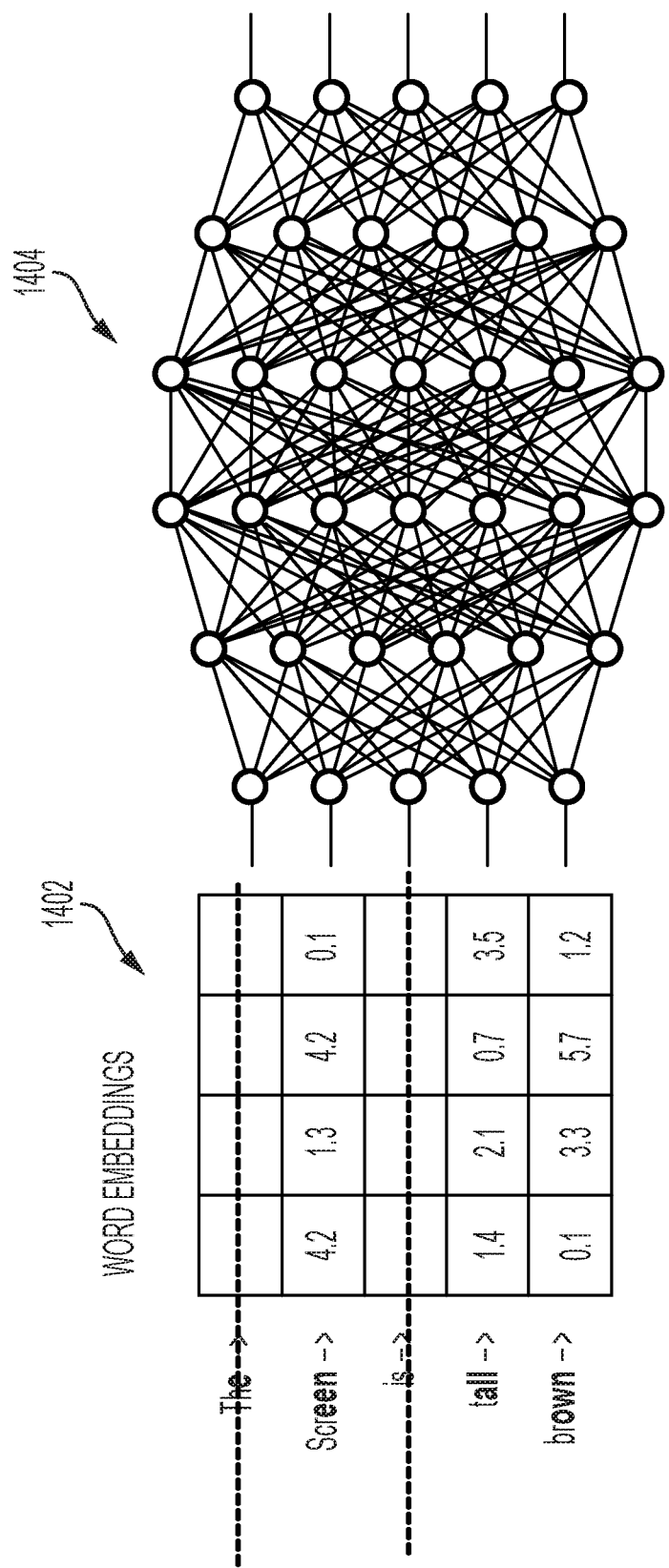
FIG. 14 shows an example process of constructing input data to run in a neural network to refine a suggested sentence in an embodiment.

In an embodiment, a sentence obtained for suggestion can be further refined by reiterating the above-process. For example, different complete words can be selected in random (e.g., rather than starting the "The" and "tall" as done in the above example, a different set of starting words can be selected), and the process of generating a sentence to suggest (e.g., as described with reference to FIG. 12 and FIG. 13) can be repeated to obtain a complete sentence. For example, one or more words can be randomly selected and their word embeddings erased, for the neural network to infer word embeddings for the erased word embeddings. FIG. 14 shows an example process of constructing input data to run in a neural network to refine a suggested sentence in an embodiment. For instance, in an embodiment, in a different iteration, the system may select different complete words, leaving different words with blank word embeddings, for input to the neural network. For example, in this iteration, an array of word vectors 1402 is constructed such that the word embeddings for words "The" and "is" are erased, and other parts words, e.g., "scr", "t" and "br" are filled in. In an embodiment, multiple iterations can occur with different input array of word vectors, for instance, with randomly selected words being complete and others being blank (e.g., one or more selected words can have associated word embeddings while others are left with null or blank word embedding). The constructed input can be run through a deep neural network 1404, which generates word embeddings. As shown in FIG. 13, the system can obtain candidate words for a word whose word embedding was erased in the input array of word vectors. The system can compare the candidate words' word embeddings with the neural network generated word embeddings. The system may choose the word that has the word embeddings that is closest to the word embeddings generated by the neural network, and provide a sentence including the chosen word. In the next iteration, other sets of words are erased and the same process is repeated, which can produce or output different sentences (e.g., a combination of words represented by word embeddings of words). The output can converge to a sentence closest to the intended sentence. For instance, in convergence, as the process repeats through multiple iterations, the difference between the erased word and the produced words may become similar, and eventually stay the same after each iteration. A sentence resulting from such convergence can be output as a sentence suggestion, for example, as one of the sentence suggestions.

Figure 15:
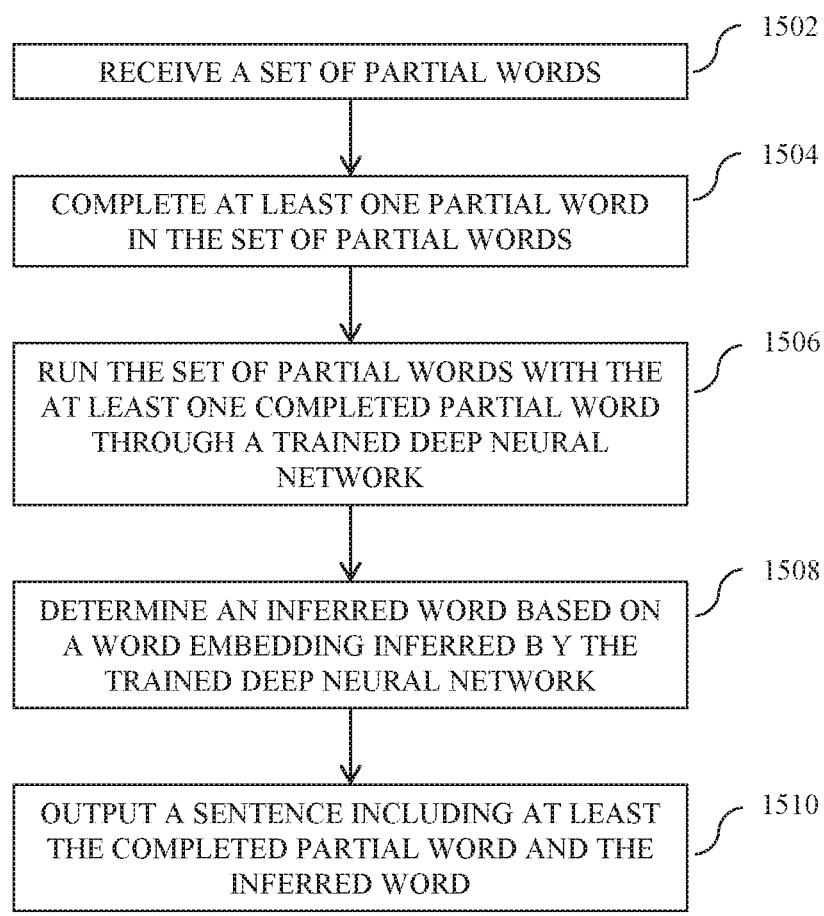
FIG. 15 is a flow diagram illustrating a method in one embodiment.

FIG. 15 is a flow diagram illustrating a method in one embodiment. The method can be performed by one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. At 1502, the method includes receiving a set of partial words. For instance, a set of partial words can be received.

At 1504, the method includes completing at least one partial word in the set of partial words. The at least one partial word can be selected randomly, for example, by a computer process. In an embodiment, for instance, if the set of words received at 1502 includes one or more complete words as well, this processing at 1504 can be omitted, for instance, at least in the first iteration. A word completing technique such as word lookup or word match based on partial letters in a word can be used to complete a partial word. Other technique can be utilized.

At 1506, the method includes running the set of partial words with the at least one completed partial word through a trained deep neural network. The trained deep neural network infers a word embedding associated with an unfinished word in the set of partial words. The input data may include multiple unfinished words and the trained deep neural network can infer word embeddings associated all of the unfinished words in the set of partial words concurrently, for example, in a one run through or iteration.

At 1508, the method includes determining an inferred word based on the inferred word embedding associated with the unfinished word. The inferred word can be inferred based on the inferred word embedding associated with the unfinished word, by generating a plurality of finished words based on the unfinished word, representing each of the plurality of finished words with a word embedding, and choosing a finished word from the plurality of finished words having the closest word embedding to the inferred word embedding. In an embodiment, input data to the deep neural network includes an array of word embeddings, the array including the word embedding associated with the completed partial word and no word embedding associated with the unfinished word, for example, blanks or null values in place of the word embedding for the unfinished word. Running of the set of partial words with at least one completed partial word through a trained deep neural network includes running the input data through the trained deep neural network.

At 1510, the method includes outputting a sentence including at least the completed partial word and the inferred word.

The method may also include repeating the processing at 1504, 1506, 1508 and 1510 with a different at least one partial word selected randomly for completing at 1504. The repeating may continue until the output sentences converge to a criterion, which can be predefined. By way of example, a criterion can be that the sentence does not change at all over a few (or preconfigured number of) iterations. Another example of the criterion can be the number of iterations. The number being preconfigured, e.g., 3 or another number.

In an embodiment, the method may also include causing a cursor positioning function key to be provided for modifying the set of partial words entered via a user interface. The cursor positioning function key functions to move a cursor appearing on an input field from an entered input word to another entered input word.

Figure 16:
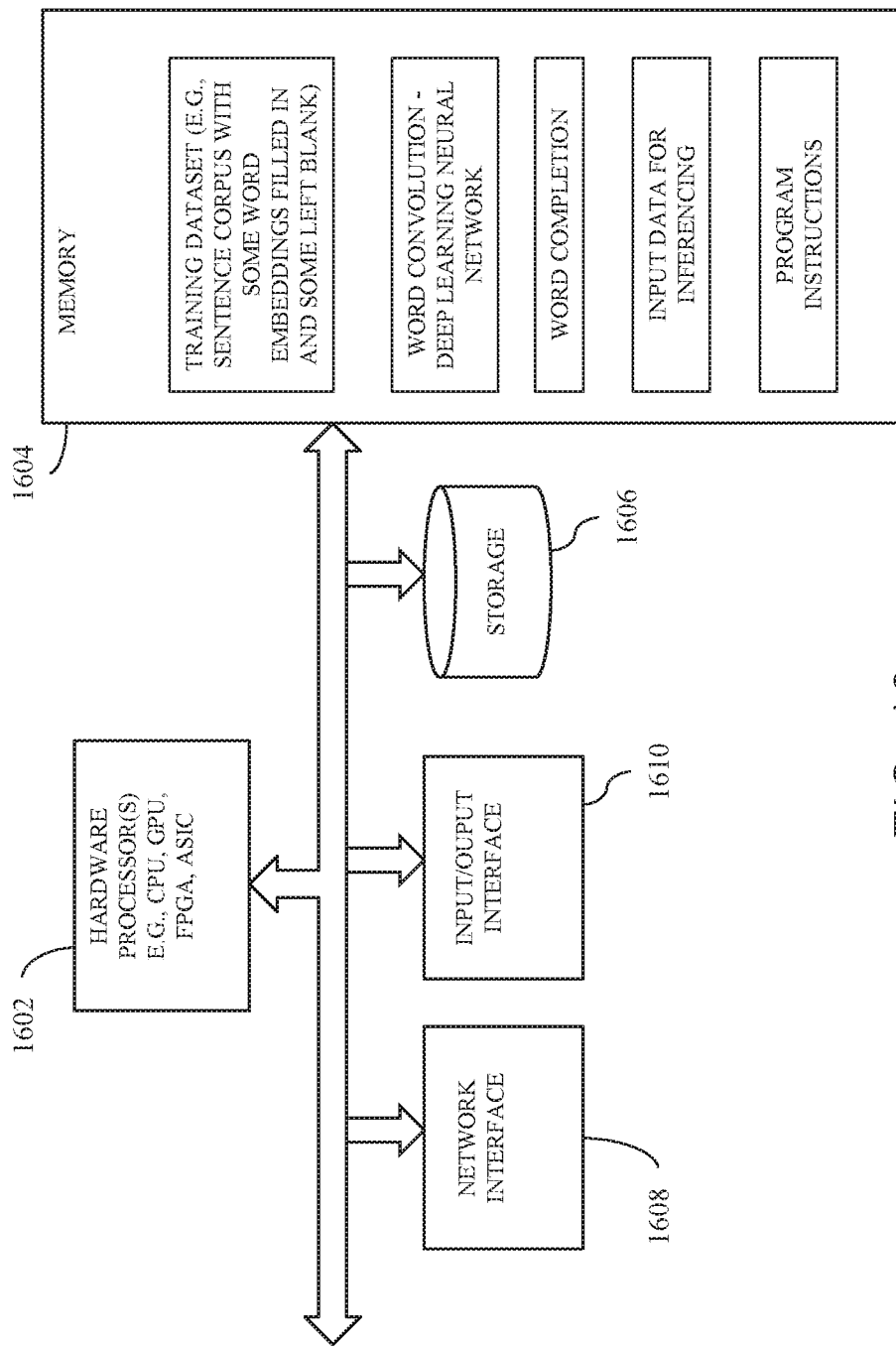
FIG. 16 is a diagram showing components of a system in an embodiment, which can provide a sentence completion based on partial word completions.

FIG. 16 is a diagram showing components of a system in an embodiment, which can provide a sentence completion based on partial word completions. One or more hardware processors 1602 such as a central processing unit (CPU), a graphic process unit (GPU), and/or a Field Programmable Gate Array (FPGA), an application specific integrated circuit (ASIC), and/or another processor, may be coupled with a memory device 1604, and train a deep neural network to be able to infer a word associated with an unfinished word. One or more processors 1604 may also receive a set of partial words for inferencing and complete at least one partial word in the set of partial words. One or more processors 1602 may run the set of partial words with at least one completed partial word through the trained deep neural network, the trained deep neural network inferring a word embedding associated with an unfinished word in the set of partial words. One or more processors 1602 may determine an inferred word based on the inferred word embedding associated with the unfinished word. One or more processors 1602 may output a sentence including at least the completed partial word and the inferred word.

A memory device 1604 may include random access memory (RAM), read-only memory (ROM) or another memory device, and may store data and/or processor instructions for implementing various functionalities associated with the methods and/or systems described herein. One or more processors 1602 may execute computer instructions stored in memory 1604 or received from another computer device or medium. A memory device 1604 may, for example, store instructions and/or data for functioning of one or more processors 1602, and may include an operating system and other program of instructions and/or data. Training data, for example, sentence corpus represented by word embeddings may be stored on a storage device 1606 or received via a network interface 1608 from a remote device, and may be temporarily loaded into a memory device 1604 for training the deep neural network, or neural network model. The trained neural network may be stored on a memory device 1604, for example, for execution for inferencing, by one or more hardware processors 1602. One or more hardware processors 1602 may be coupled with interface devices such as a network interface 1608 for communicating with remote systems, for example, via a network, and an input/output interface 1610 for communicating with input and/or output devices such as a keyboard, mouse, display, and/or others.

Figure 17:
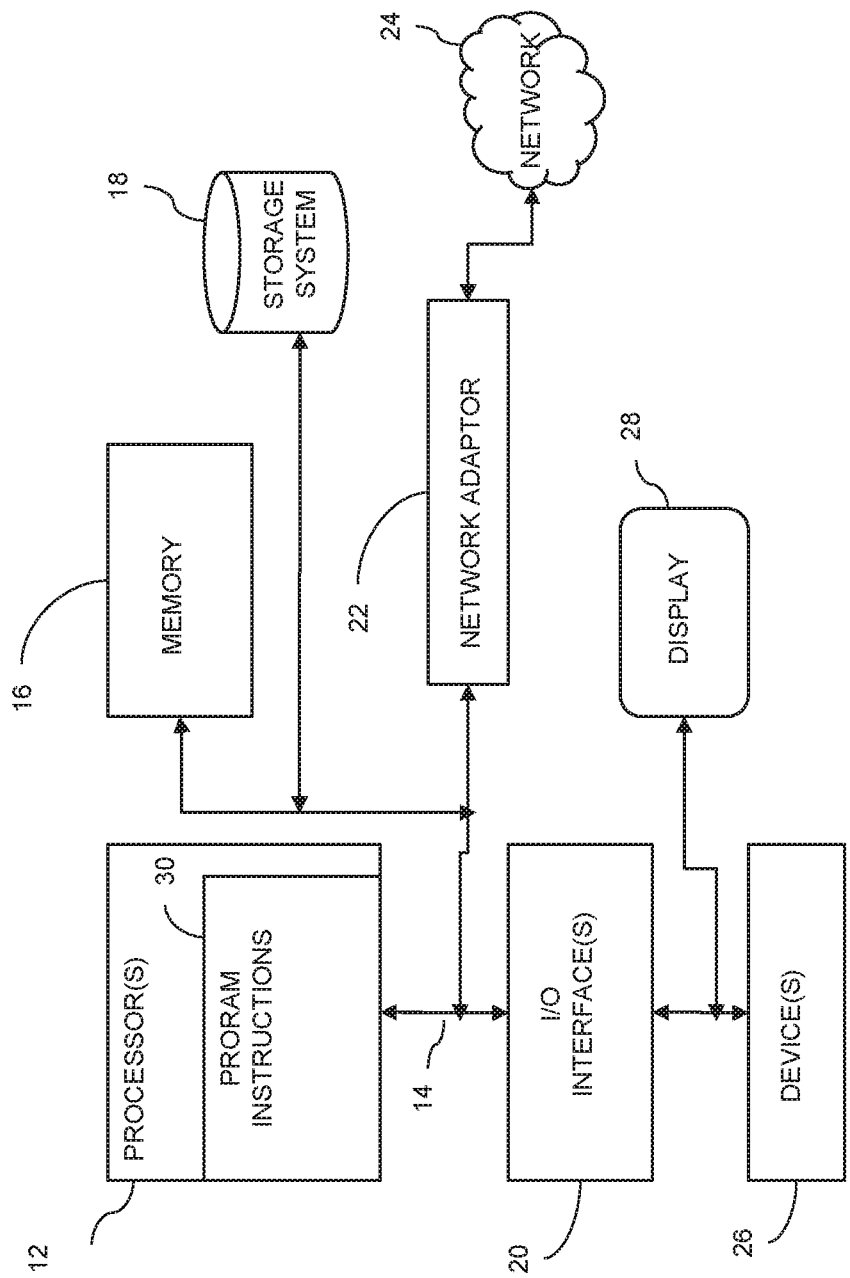
FIG. 17 illustrates a schematic of an example computer or processing system that may implement a system in an embodiment.

FIG. 17 illustrates a schematic of an example computer or processing system that may implement a system in an embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 17 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising: receiving a set of partial words; completing at least one partial word in the set of partial words; running the set of partial words with the at least one completed partial word through a trained deep neural network, the trained deep neural network inferring a word embedding associated with an unfinished word in the set of partial words, the word embedding including a vector of numerical values having defined length, the word embedding convolved over layers of the trained deep neural network; determining an inferred word based on the inferred word embedding associated with the unfinished word; and outputting a sentence including at least the completed partial word and the inferred word; further including constructing an input data including an array of word embeddings, the array including the word embedding associated with the completed partial word and no word embedding associated with the unfinished word, wherein the running of the set of partial words with the at least one completed partial word through a trained deep neural network includes running the input data through the trained deep neural network; and wherein the trained deep neural network infers word embeddings associated with all unfinished words in the set of partial words concurrently.

2. The method of claim 1, wherein the at least one partial word is selected randomly for the completing step.

3. The method of claim 1, wherein the determining of the inferred word based on the inferred word embedding associated with the unfinished word includes generating a plurality of finished words based on the unfinished word, representing each of the plurality of finished words with a word embedding, and choosing a finished word from the plurality of finished words having closest word embedding to the inferred word embedding.

4. The method of claim 1, further including repeating the completing, running, determining and outputting, with a different at least one partial word selected randomly for the completing.

5. The method of claim 1, further including causing a cursor positioning function key to be provided for modifying the set of partial words entered via a user interface, wherein the cursor positioning function key functions to move a cursor appearing on an input field from an entered input word to another entered input word.

6. A computer program product comprising a computer readable storage medium having program instructions embodied therewith, the program instructions executable by a device to cause the device to: receive a set of partial words; complete at least one partial word in the set of partial words; run the set of partial words with the at least one completed partial word through a trained deep neural network, the trained deep neural network inferring a word embedding associated with an unfinished word in the set of partial words, the word embedding including a vector of numerical values having defined length, the word embedding convolved over layers of the trained deep neural network; determine an inferred word based on the inferred word embedding associated with the unfinished word; and output a sentence including at least the completed partial word and the inferred word; wherein the device is caused to construct an input data including an array of word embeddings, the array including the word embedding associated with the completed partial word and no word embedding associated with the unfinished word, wherein the device is caused to run of the set of partial words with the at least one completed partial word through a trained deep neural network by running the input data through the trained deep neural network; and wherein the trained deep neural network infers word embeddings associated with all unfinished words in the set of partial words concurrently.

7. The computer program product of claim 6, wherein the device is caused to select randomly the at least one partial word for completing.

8. The computer program product of claim 6, wherein, to determine the inferred word based on the inferred word embedding associated with the unfinished word, the device is caused to generate a plurality of finished words based on the unfinished word, represent each of the plurality of finished words with a word embedding, and choose a finished word from the plurality of finished words having closest word embedding to the inferred word embedding.

9. The computer program product of claim 6, wherein the device is further caused to repeat completing, running, determining and outputting, with a different at least one partial word selected randomly for the completing.

10. The computer program product of claim 6, wherein the device is further caused to cause providing of a cursor positioning function key for allowing modifying of the set of partial words entered via a user interface, wherein the cursor positioning function key functions to move a cursor appearing on an input field from an entered input word to another entered input word.

11. A system, comprising: a hardware processor; a memory device communicatively coupled with the hardware processor; the hardware processor configured to at least: receive a set of partial words; complete at least one partial word in the set of partial words; run the set of partial words with the at least one completed partial word through a trained deep neural network, the trained deep neural network inferring a word embedding associated with an unfinished word in the set of partial words, the word embedding including a vector of numerical values having defined length, the word embedding convolved over layers of the trained deep neural network; determine an inferred word based on the inferred word embedding associated with the unfinished word; and output a sentence including at least the completed partial word and the inferred word; wherein the hardware processor is configured to construct an input data including an array of word embeddings, the array including the word embedding associated with the completed partial word and no word embedding associated with the unfinished word, wherein the hardware processor is configured to run of the set of partial words with the at least one completed partial word through a trained deep neural network by running the input data through the trained deep neural network; and wherein the trained deep neural network infers word embeddings associated with all unfinished words in the set of partial words concurrently.

12. The system of claim 11, wherein the hardware processor is configured to select randomly the at least one partial word for completing.

13. The system of claim 11, wherein, to determine the inferred word based on the inferred word embedding associated with the unfinished word, the hardware processor is configured to generate a plurality of finished words based on the unfinished word, represent each of the plurality of finished words with a word embedding, and choose a finished word from the plurality of finished words having closest word embedding to the inferred word embedding.

14. The system of claim 11, wherein the hardware processor is further configured to repeat completing, running, determining and outputting, with a different at least one partial word selected randomly for the completing.

\* \* \* \* \*